(12) United States Patent
Matsumoto et al.

(10) Patent No.: US 6,295,214 B1
(45) Date of Patent: Sep. 25, 2001

(54) SWITCHING POWER SUPPLY UNIT

(75) Inventors: Tadahiko Matsumoto; Takayoshi Nishiyama, both of Yokahama; Jun Nagai, Sagamihara, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/538,427

(22) Filed: Mar. 29, 2000

(30) Foreign Application Priority Data

Apr. 2, 1999 (JP) .................................................. 11-096510

(51) Int. Cl.[7] .................................................. H02M 3/335
(52) U.S. Cl. ...................................... 363/21.01; 363/21.06
(58) Field of Search .................................. 363/21, 97, 98, 363/131, 132, 127; 323/282, 285, 289, 284, 268, 259

(56) References Cited

U.S. PATENT DOCUMENTS 5,414,341 * 5/1995 Brown ................................... 323/268
5,999,429 * 12/1999 Brown ................................... 363/89

* cited by examiner

Primary Examiner—Peter S. Wong
Assistant Examiner—Rajnikant B. Patel
(74) Attorney, Agent, or Firm—Ostrolenk, Faber, Gerb & Soffen, LLP

(57) ABSTRACT

A switching power supply unit, which rectifies and smoothes an AC current and an AC voltage from the on-off switching operation of a main switching element to output a DC current and a DC voltage, has an output current detection circuit including a current detection resistor disposed in an intermittent-current flowing path through which a current intermittently flows in sync with the on-off switching operation of the main switching element, a synchronous rectifying a switching element for rectifying a current flowing through the current detection resistor, and a capacitor for charging the current rectified by the synchronous rectifying element, wherein the current flowing through the current detection resistor is charged in the capacitor by a rectifying operation of the synchronous rectifying element, and the charging voltage of the capacitor is outputted as a voltage corresponding to the output current of the switching power supply unit.

14 Claims, 5 Drawing Sheets

SWITCHING POWER SUPPLY UNIT

BACKGROUND OF THE INVENTION

1. Field of the Invention

The present invention relates to switching power supply units outputting a DC current and a DC voltage.

2. Description of the Related Art

FIG. 5 shows an example of a prior art main circuit structure of a switching power supply unit. The switching power supply unit shown in FIG. 5 is a forward converter in which a transformer 1 is disposed. A primary coil 2 of the transformer 1 is electrically connected to a primary-side circuit having a main switching element 3 (an N-channel MOS-FET in the example shown in FIG. 5) and a capacitor 4, and a secondary coil 5 is electrically connected to an output-side circuit (a secondary-side circuit) 10 having a rectifying diode 6, a commutating diode 7, an inductor 8, and a capacitor 9.

In addition, the gate of the main switching element 3 is electrically connected to a switching control circuit 11 controlling the on-off switching operation of the main switching element 3. Furthermore, an output voltage detection unit 11a and an output current detection unit 12, which will be described below, are also provided as shown.

There is provided a structure in which a DC current and a DC voltage are inputted to the primary-side circuit via input terminals 13a and 13b. As already known, the inputted DC current and DC voltage are converted into an AC current and an AC voltage by the on-off switching operation of the main switching element 3, and then, the AC current and AC voltage are outputted to the output-side circuit 10 from the secondary coil 5 of the transformer 1.

In the output-side circuit 10, the AC current and AC voltage are rectified and smoothed by using a choke-input rectifying method, and the rectified and smoothed DC current and DC voltage are outputted as an output current Iout and an output voltage Vout of the switching power supply unit to a load 15 via output terminals 14a and 14b.

The output voltage detection unit 11a shown in FIG. 5 directly detects the output voltage Vout of the switching power supply unit outputted to the load 15 from the output-side circuit 10, and then outputs a voltage corresponding to the output voltage Vout to the switching control circuit 11. The switching control circuit 11 controls the on-off switching operation of the main switching element 3 so that the output voltage Vout is outputted with a specified voltage value in a stabilized manner based on the applied voltage.

As shown in FIG. 5, the output current detection circuit 12 comprises a current transformer 16, a rectifying diode 17, a resistor 18, and a capacitor 19. The current transformer 16 is disposed on a current-flowing path through which the same current as a drain current of the main switching element 3 flows. The drain current of the main switching element 3 is converted into a voltage and is amplified by the current transformer 16 and the resistor 18. The voltage is rectified by the rectifying diode 17 and then is charged in the capacitor 19.

The value of the drain current of the main switching element 3 periodically changes. A current value at peak (hereinafter referred to as a peak current value) during a period as a cycle in the drain current of the main switching element 3 is a current value corresponding to the output current Iout of the switching power supply unit. Since the charging voltage value of the capacitor 19 is approximately equivalent to a voltage value corresponding to the peak current value of the drain current of the main switching element 3, the charging voltage of the capacitor 19 is also a voltage corresponding to the output current Iout of the switching power supply unit. The output current detection circuit 12 outputs the charging voltage of the capacitor 19 as a voltage corresponding to the output current Iout.

In the example shown in FIG. 5, the output voltage of the output current detection circuit 12 is applied to the switching control circuit 11. When the switching control circuit 11 detects that the output current Iout is in an overcurrent state due to an abnormal condition of the load 15 or the like based on the output voltage of the output current detection circuit 12, it controls the switching of the main switching element 3 in such a manner that the output current Iout decreases so as to eliminate the overcurrent state, by which the switching power supply unit is protected.

In the example shown in FIG. 5, the output current detection circuit 12, as described above, has a circuit structure of detecting and outputting the voltage corresponding to the output current Iout by using the current transformer 16. However, since the current transformer 16 is an expensive and large component, cost reduction and miniaturization of the switching power supply unit cannot be achieved.

Thus, an output current detection circuit in which a resistor is disposed as an alternative to the current transformer 16 has been provided. However, in this case, there is a large amount of conduction loss of the resistor, which leads to a problem in that the circuit efficiency of the switching power supply unit deteriorates.

Regarding this case, the reason for causing such a problem will be described as follows. In the aforementioned output current detection circuit having the resistor as an alternative to the current transformer 16, a diode is used for rectification. When the voltage applied to the resistor is approximately equal to the forward voltage drop of the diode, the output voltage outputted from the output current detection circuit changes according to changes in temperature due to a negative influence of dropping of the forward voltage of the diode, regardless of changes in the output current Iout, which is a problem of temperature drift.

In order to prevent such a problem of temperature drift, there is provided a structure in which a resistance value of the resistor is set to be large so that the voltage applied to the resistor is significantly larger (for example, 5 to 6 V) than the forward voltage of the drop of the diode. As a result, as described above, the conduction loss in the resistor significantly increases, and this leads to the problem that the circuit efficiency of the switching power supply unit deteriorates.

SUMMARY OF THE INVENTION

The present invention is presented to solve the above problems. It is an object of the present invention to provide a switching power supply unit having an output current detection circuit capable of providing cost reduction and miniaturization of the switching power supply unit and preventing the deterioration of circuit efficiency.

To this end, the present invention provides the following arrangement to solve the above problems. According to a first aspect of the present invention, there is provided a switching power supply unit which rectifies and smoothes an AC current and an AC voltage obtained from the on-off switching operation of a main switching element to output a DC current and a DC voltage. This switching power supply unit has an output current detection circuit including a current detection resistor disposed in an intermittent-current flowing path through which a current intermittently flows in sync with the on-off switching operation of the main switching element, a synchronous rectifying element comprising a switching element for rectifying a current flowing through the current detection resistor, and a capacitor for charging the current rectified by the synchronous rectifying element, in which the current flowing through the current detection resistor is charged in the capacitor by a rectifying operation of the synchronous rectifying element, and the charging voltage of the capacitor is outputted as a voltage corresponding to the output current of the switching power supply unit. This arrangement can solve the above-described problems.

According to a second aspect of the present invention, the structure of the first aspect of the invention described above being provided, an overcurrent protection circuit is provided to protect the switching power supply unit by controlling the on-off switching operation of the main switching element in such a manner that the output current decreases so as to eliminate an overcurrent state when the output current of the switching power supply unit is in the overcurrent state, and the voltage outputted from the output current detection circuit is applied to the overcurrent protection circuit to be used as a voltage for detecting the overcurrent state.

According to a third aspect of the present invention, the structure of the first aspect of the invention described above is provided, in which, on a primary side of the switching power supply unit, an output voltage detection circuit having a smoothing/rectifying circuit structure similar to that of a secondary-side circuit of the switching power supply unit is disposed to indirectly detect and output the output voltage of the switching power supply unit; and a switching control circuit is disposed to control the on-off switching operation of the main switching element by using the voltage detected and outputted by the output voltage detection circuit so as to control the stabilization of the output voltage of the switching power supply unit, the voltage outputted by the output current detection circuit being superimposed on the voltage detected and outputted by the output voltage detection circuit, and then, the superimposed voltage being inputted to the switching control circuit to be used for controlling the on-off switching operation of the main switching element.

According to a fourth aspect of the present invention, the structure of the first, second, or third aspect of the invention described above is provided, in which the synchronous rectifying element is a MOS-FET.

According to the present invention, the output current detection circuit for detecting and outputting a voltage corresponding to the output current of the switching power supply unit comprises the current detection resistor, the synchronous rectifying element, and the capacitor. Thus, the output current detection circuit is formed without using a large and expensive component such as a current transformer. With this arrangement, it is possible to prevent the problem in that miniaturization and cost reduction of the switching power supply unit are hindered by the components comprising the output current detection circuit.

In addition, since the synchronous rectifying element comprising a switching element such as a MOS-FET is used, a problem occurring when a diode is used as a rectifying element can be avoided. In other words, when a diode is used, in order to prevent the negative influence of the dropping of the forward voltage of the diode on the output voltage of the output current detection circuit, a resistor having a large resistance value is used as a current detection resistor. However, the use of a current detection resistor having a large resistance value permits the conduction loss in the current detection resistor to significantly increase. This causes a problem of deteriorating the circuit efficiency of the switching power supply unit.

In contrast, because the present invention does not use a diode as a rectifying element, there is no concern about the occurrence of a problem caused by the negative influence of dropping in the forward voltage of the diode. Thus, a resistor having a small resistance value can be used as a current detection resistor, and the conduction loss in the current detection resistor can be decreased. With this arrangement, a switching power supply unit with high efficiency can be provided.

The voltage from the output current detection circuit is applied to an overcurrent protection circuit to be used as a voltage for detecting an overcurrent state. In this arrangement, the voltage outputted from the output current detection circuit is a DC voltage. Thus, without use of an expensive comparator such as a rapid-response type of comparator, an overcurrent reduction characteristic, in which a satisfactory overcurrent protection operation is performed, can be obtained. As a result, the present invention can provide a switching power supply unit at low cost with a good overcurrent reduction characteristic in the overcurrent protection operation.

The voltage outputted from the output current detection circuit is superimposed upon the voltage outputted from the output voltage detection circuit, and the superimposed voltage is applied to the switching control circuit to be used for controlling the switching operation of the main switching element. In this case, the superimposed voltage includes both the information of the output voltage and the information of the output current of the switching power supply unit. As a result, a decrease in the output voltage due to an increase in the output current can be detected with high precision, and a further stabilization of the output voltage can thereby be controlled.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
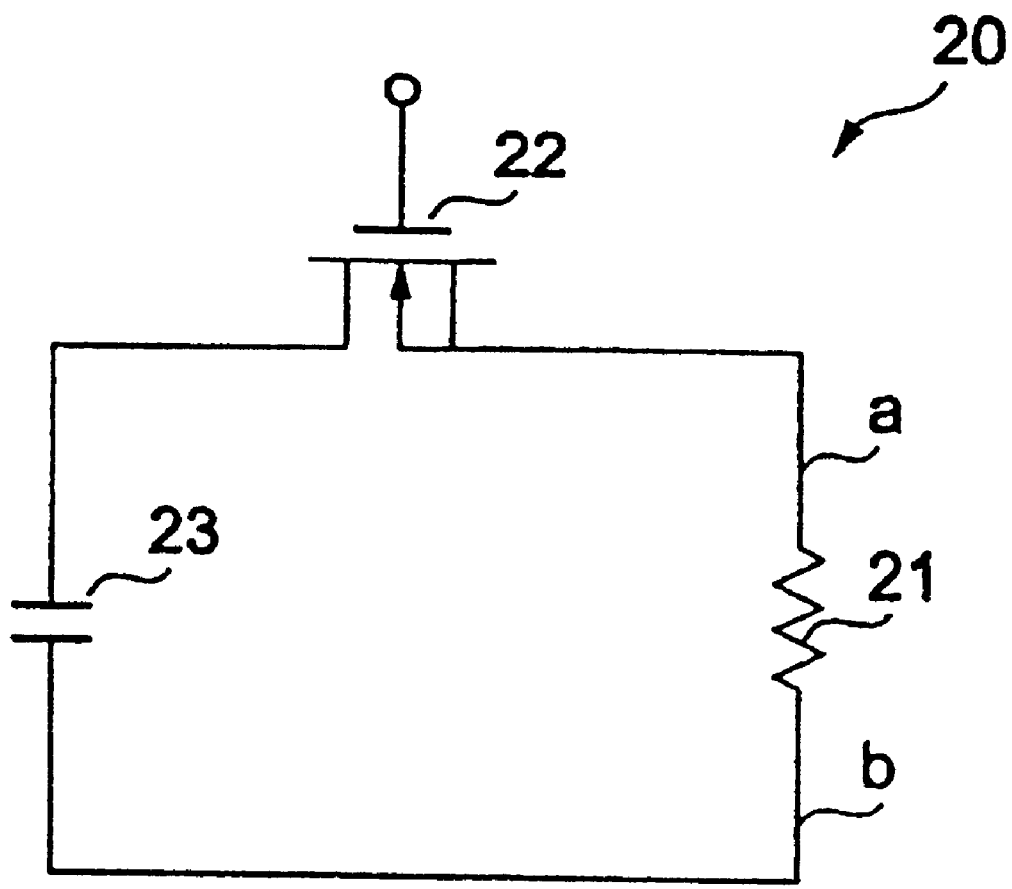
FIG. 1 is a circuit structural view illustrating an output current detection circuit incorporated in a switching power supply unit according to an embodiment of the present invention.
Figure 5:
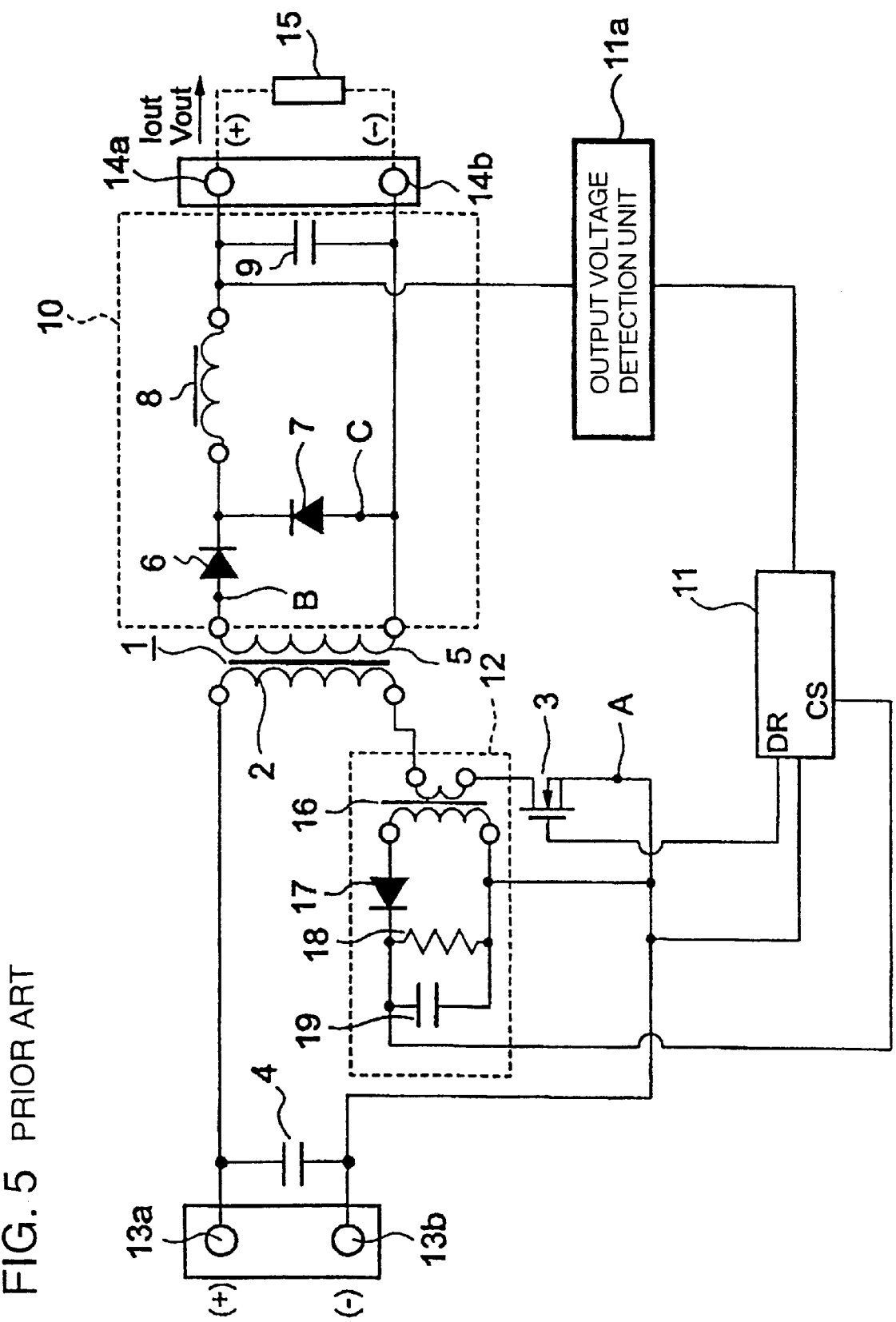
FIG. 5 is a circuit structural view illustrating an example of a switching power supply in which an output current detection circuit having a conventional structure is incorporated.

FIG. 1 shows the circuit structure of an output current detection circuit, which is distinctive in the embodiment of the present invention. An output current detection circuit 20 shown in FIG. 1, which is incorporated in the circuit of the switching power supply unit as shown in FIG. 5, outputs a voltage according to the output current Iout of the switching power supply unit. This has an innovative circuit structure, which has not been included in the conventional art. In the illustration of this embodiment, the same components as those in the conventional art have the same reference numerals and the explanation of the same components is omitted.

As shown in FIG. 1, the output current detection circuit 20 of the embodiment includes a current detection resistor 21, a MOS-FET 22 as a synchronous rectifying element, and a capacitor (a changing-capacitor) 23. One end a of the current detection resistor 21 is connected to one of the source and drain (the source in the example shown in FIG. 1) of the MOS-FET 22, and the other side thereof is connected to one end of the changing-capacitor 23. The other end of the charging-capacitor 23 is connected to the other end b of the current detection resistor 21.

The current detection resistor 21 is disposed on an intermittent-current flowing path (for example, a position A, a position B, or a position C shown in FIG. 5) through which a current intermittently flows in sync with the on-off switching operation of a main switching element 3. An intermittent current flows through the current detection resistor 21 in sync with the on-off switching operation of the main switching element 3.

In other words, for example, in a case in which the current detection resistor 21 is disposed at the position A shown in FIG. 5, a current flows through the current detection resistor 21 when the main switching element 3 is switched on, and no current flows through the current detection resistor 21 when the main switching element 3 is switched off. In addition, for example, in a case in which the current detection resistor 21 is disposed at the position B or C shown in FIG. 5, when the main switching element 3 is switched on, no current flows through the current detection resistor 21. When the main switching element 3 is switched off, a current flows through the current detection resistor 21.

A voltage signal for controlling the on-off switching operation of the MOS-FET 22 is applied to the gate of the MOS-FET 22. This voltage signal permits the MOS-FET 22 to perform the switching operations.

The timing for switching on the MOS-FET 22 can be set as required as long as it is the instant that a current begins to flow through the current detection resistor 21 or during a period in which the current is flowing through the current detection resistor 21. In addition, the timing for switching off the MOS-FET 22 can be set as required as long as it is the instant that a current stops flowing through the current detection resistor 21 or during a period in which the current is flowing through the current detection resistor 21. In other words, the switching control of the MOS-FET 22 is performed in such a manner that, during a part of or approximately the entirety of the period in which a current is flowing through the current detection resistor 21, the MOS-FET 22 is in the state of switching-on, and at least when a current is not flowing through the current detection resistor 21, the MOS-FET 22 is in the state of switching-off.

As described here, since the MOS-FET 22 is in the state of switching-on when a current is flowing through the current detection resistor 21, the current flowing through the current detection resistor 21 is rectified via the MOS-FET 22 to be charged in the charging capacitor 23. The charging voltage of the charging capacitor 23 is a voltage corresponding to a peak current value of the current flowing through the current detection resistor 21.

The peak current value of an intermittent current synchronized the main switching element 3, that is, the peak current value of the current flowing through the current detection resistor 21, is a current value corresponding to the output current Iout of the switching power supply unit. Therefore, the charging voltage of the charging-capacitor 23 is the voltage corresponding to the output current Iout of the switching power supply unit.

The output current detection circuit 20 shown in FIG. 1 outputs the charging voltage of the charging-capacitor 23 as the voltage corresponding to the output current Iout of the switching power supply unit.

In this embodiment, as described above, since the MOS-FET 22 is controlled to be in the state of switching-off during the period in which a current is not flowing through the current detection resistor 21, discharging with the back flow of a current occurring in a path from the charging-capacitor 23 to the current detection resistor 21 via the MOS-FET 22 is prevented during the period in which the current detection resistor 21 is in the conduction-off state. With this arrangement, even in the period in which the current detection resistor 21 is in the conduction-off state, the charging voltage of the charging-capacitor 23 can be maintained by the above-described charging operation. As a result, in this embodiment, the voltage outputted from the output current detection circuit 20 is a DC voltage.

The output current detection circuit 20 shown in FIG. 1 is formed as above. The output current detection circuit 20 having the circuit structure shown in FIG. 1 does not require an expensive and large current transformer as described above. As a result, hindrances to cost reduction and upsizing of the switching power supply unit caused by the components comprising the output current detection circuit can be avoided.

Furthermore, instead of using a diode, since the MOS-FET 22 is used to rectify the current flowing through the current detection resistor 21, it is not necessary to worry about any diode-related problems, that is, the problem of temperature drifting in which the output voltage of the output current detection circuit changes as the temperature changes. Thus, a resistor having a small resistance value as the current detection resistor 21 can be used. As a result, the conduction loss in the current detection resistor 21 can be significantly suppressed by using a resistor having a small resistance value as the current detection resistor 21. This can prevent the deterioration of circuit efficiency of the switching power supply unit.

Figure 2:
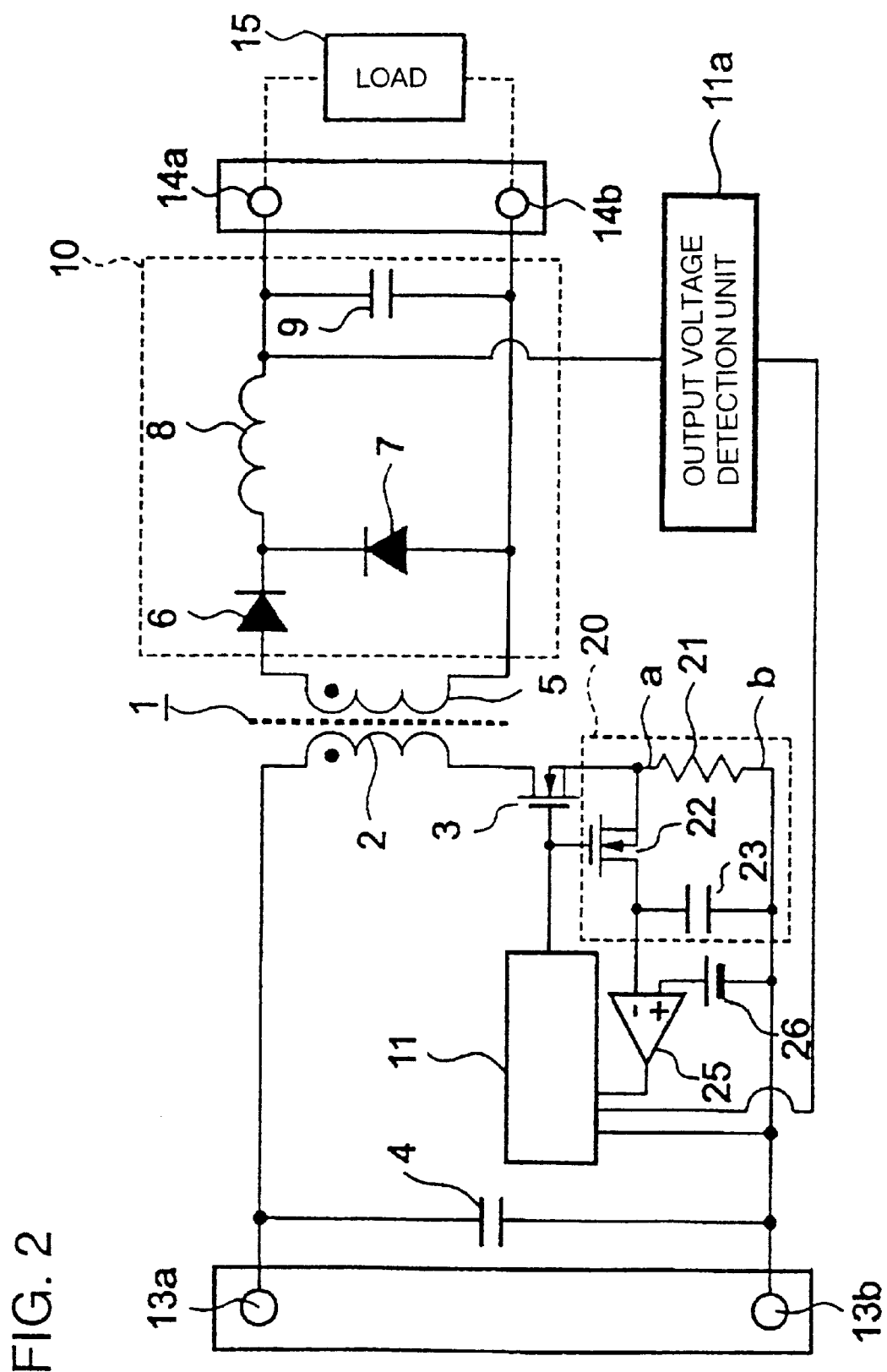
FIG. 2 is a circuit structural view of a first example obtained when the output current detection circuit shown in FIG. 1 is incorporated in a switching power supply unit.

The voltage detected and outputted by the output current detection circuit 20 shown in FIG. 1 can be used for various controlling operations of the switching power supply unit. For example, FIG. 2 shows a first example of the switching power supply unit incorporating the above output current detection circuit 20. In the first example, the voltage detected and outputted by the output current detection circuit 20 is used for controlling the overcurrent protection of the switching power supply unit.

The switching power supply unit shown in FIG. 2 is a resonance reset forward converter, and has approximately the same circuit structure as that of the circuit shown in FIG. 5. A different distinctive point of the switching power supply unit shown in FIG. 2 is that as an alternative to the output current detection circuit 12 shown in FIG. 5, the output current detection circuit 20 shown in FIG. 1 is disposed. In the illustration of FIG. 2, the same components as those shown in FIG. 5 have the same reference numerals, and the explanation of the same components thereof is omitted.

In the example shown in FIG. 2, a current detection resistor 21 of the output current detection circuit 20 is connected in series to the source of a main switching element 3.

Figure 3:
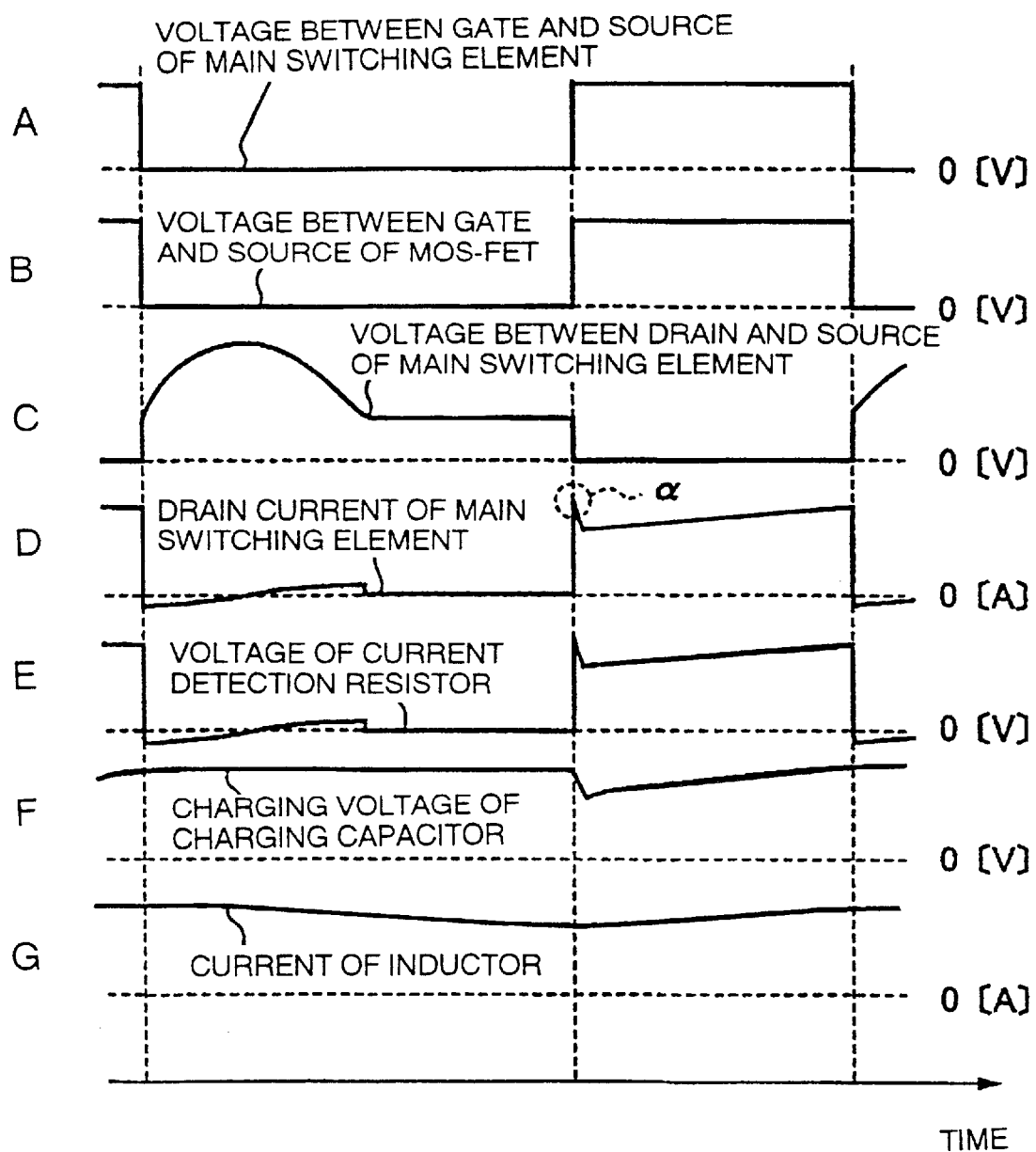
FIG. 3 shows waveform charts showing the examples of operational waveforms of a main circuit-forming section in the switching power supply unit shown in FIG. 2.

A voltage signal of a pulse form, as shown by waveform A in FIG. 3, is applied to the gate of the main switching element 3 from a switching control circuit 11. Based on the pulse signal, as shown by waveform D, a drain current intermittently flows between the drain of the main switching element 3 and the source thereof, and an intermittent current having the same waveform as that of the drain current of the main switching element 3 flows through the current detection resistor 21 connected in series to the source of the main switching element 3, by which the waveform of a voltage applied to the current detection resistor 21 is a voltage waveform as shown by waveform E in FIG. 3.

The node of the source of the main switching element 3 and the current detection resistor 21 is connected to the source of the MOS-FET 22 of the output current detection circuit 20. The gate of the MOS-FET 22 is connected to the node of the gate of the main switching element 3 and the switching control circuit 11. As a result, approximately the same pulse signal as the pulse signal applied to the gate of the main switching element 3 is applied to the gate of the MOS-FET 22, as shown by waveform B in FIG. 3, by which the MOS-FET 22 performs the on-off switching operation in sync with the on-off switching operation of the main switching element 3.

The drain of the MOS-FET 22 is connected to one end of the charging-capacitor 23. Since the MOS-FET 22, as shown above, performs the on-off switching operation in sync with the on-off switching operation of the main switching element 3, the MOS-FET 22 is in the state of switching-on during the period in which a current is flowing through the current detection resistor 21. As a result, the current flowing through the current detection resistor 21 passes through the MOS-FET 22 to be rectified and charged in the charging-capacitor 23.

As described above, with the charging operation, the voltage corresponding to the peak current value of the current flowing through the current detection resistor 21, that is, the voltage corresponding to the output current Iout of the switching power supply unit is applied to the charging-capacitor 23. In addition, since the MOS-FET 22 is in the state of switching-off when a current is not flowing through the current detection resistor 21, discharging of the charging-capacitor 23 is prevented. As a result, during the period in which the MOS-FET 22 is in the state of switching-off, the charging voltage of the charging-capacitor 23 is maintained to be a voltage obtained immediately before the MOS-FET 22 is switched off, as shown by waveform F in FIG. 3. With this arrangement, the output current detection circuit 20 outputs the charging voltage of the charging-capacitor 23 as a DC voltage corresponding to the output current Iout of the switching power supply unit.

As shown in FIG. 2, the output end of the charging-capacitor 23 is connected to the (−) input terminal of a comparator 25. In addition, the (+) input terminal of the comparator 25 is connected to a reference voltage source 26. The output terminal of the comparator 25 is connected to the switching control circuit 11.

In the circuit shown in FIG. 2, an overcurrent protection circuit is comprises the switching control circuit 11, the comparator 25, and the reference voltage source 26.

In other words, the comparator 25 compares the charging voltage of the charging-capacitor 23 (which is the voltage outputted from the output current detection circuit 20) with the voltage of the reference voltage source 26. When the output current Iout of the switching power supply unit is in an overcurrent state due to an abnormal circuit condition of the load 15 or the like and the output voltage of the output current detection circuit 20 is larger than the voltage of the reference voltage source 26, the comparator 25 outputs a signal for informing that the above output current Iout is in the overcurrent state to the switching control circuit 11.

As described above, when the signal for informing that the above output current Iout is in the overcurrent state is sent to the switching control circuit 11, the switching control circuit 11 gives priority to an overcurrent protection operation. As a result, the switching control circuit 11 controls the on-off switching operation of the main switching element 3 to eliminate the overcurrent state so as to protect the switching power supply unit.

As described above, in the switching power supply unit shown in FIG. 2, the output voltage of the output current detection circuit 20 distinctive in this embodiment is applied to the overcurrent protection circuit to be used as the voltage for detecting the overcurrent state to determine whether or not the output current Iout of the switching power supply unit is in the overcurrent state.

According to the first example, with the use of the output current detection circuit 20 distinctive in this embodiment, as described above, the hindrances to cost reduction and miniaturization of the switching power supply unit can be avoided. In addition, there is an advantage in that the deterioration of the circuit efficiency of the switching power supply unit caused by the components of the output current detection circuit can be prevented.

Furthermore, the output current detection circuit 20 distinctive in this embodiment has a structure such that it outputs a DC voltage as the voltage corresponding to the output current Iout of the switching power supply unit to the comparator 25. Thus, the following advantages can be obtained.

In order to obtain a satisfactory drooping characteristic by using a pulse-by-pulse system, for example, in a case of a DC—DC converter having a switching frequency of a few hundred KHz, it is necessary to have a rapid-response type of comparator having a rapidly responding capability in which it takes a few nsec to a few tens of nsec to react. Such a rapid-response type of comparator is very expensive, which leads to an increase in the cost of the switching power supply unit.

In addition, in general, the rapid-response type of comparator has a high power consumption, which deteriorates the efficiency characteristic of the switching power supply unit.

In contrast, in the first example, as described above, the switching power supply unit has the structure in which a DC voltage is applied to the comparator 25 from the output current detection circuit 20 to compare the DC voltage with the voltage of the reference voltage source 26. Accordingly, without using such a rapid-response type of comparator, a satisfactory overcurrent reduction characteristic can be obtained, with the result that it is possible to immediately eliminate an overcurrent state when the output current Iout is in the overcurrent state. In other words, an increase in the cost of the switching power supply unit can be suppressed, and at the same time, the switching power supply unit can have a satisfactory overcurrent reduction characteristic in the overcurrent protection operation.

As described above, the output current detection circuit 20 shown in FIG. 1 is incorporated in the switching power supply unit, as shown in FIG. 2 and the output voltage of the output current detection circuit 20 is used as the voltage for detecting the overcurrent state of the overcurrent protection circuit, by which the above-described advantages can be obtained.

Figure 4:
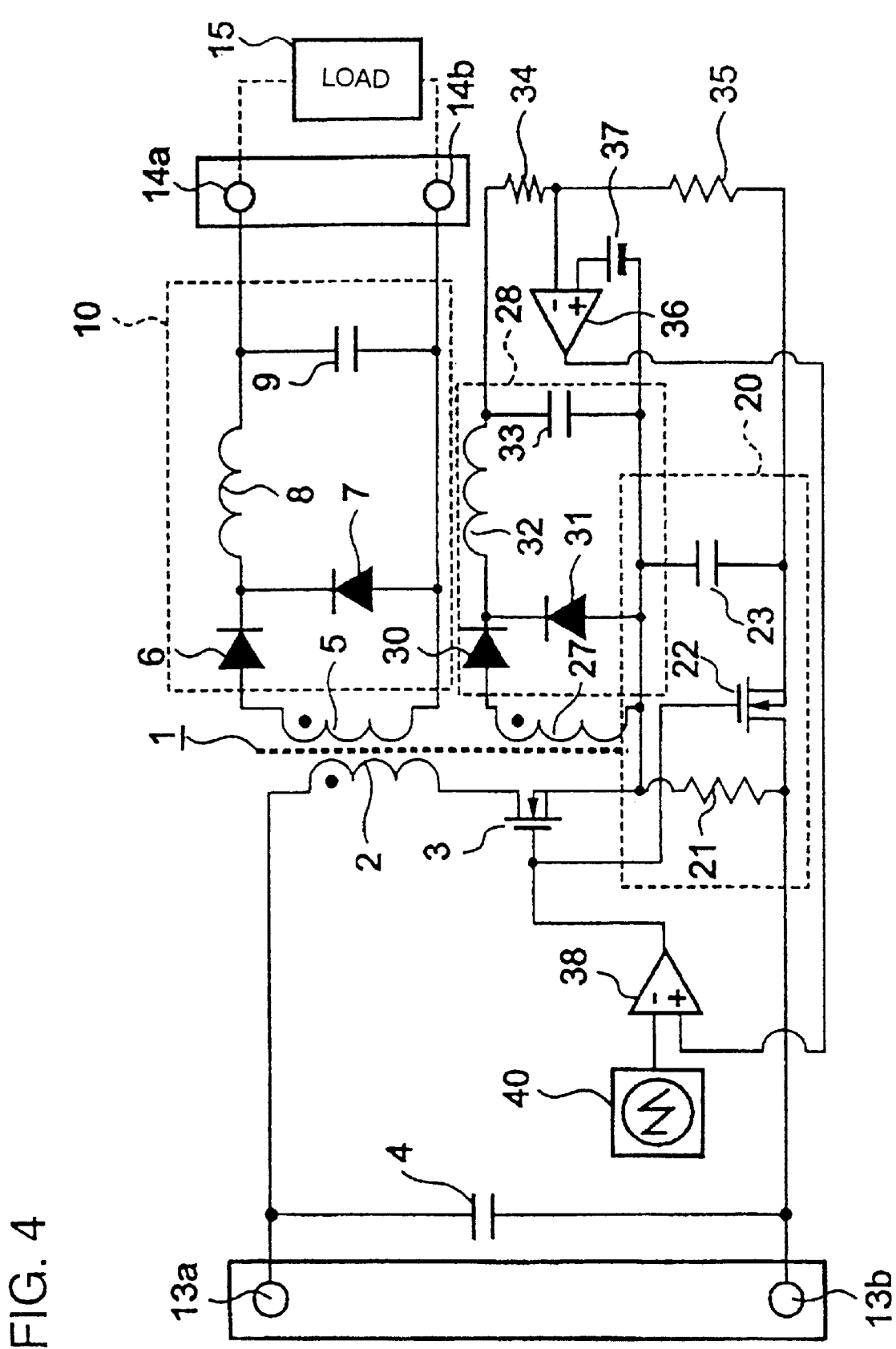
FIG. 4 is a circuit structural view of a second example obtained when the output current detection circuit shown in FIG. 1 is incorporated in a switching power supply unit.

FIG. 4 shows a second example of the switching power supply unit incorporating the output current detection circuit 20 shown in FIG. 1. In the illustration of the switching power supply unit shown in FIG. 4, the same components as those of the circuits shown in FIGS. 1, 2, and 5 have the same reference numerals and the explanation of the same components is omitted.

The switching power supply unit shown in FIG. 4 is a resonance reset forward converter. The primary-side circuit and the output-side circuit 10 shown in FIG. 4 have the same circuit structure as the primary-side circuit and the output-side circuit 10 shown in FIG. 5.

In the switching power supply unit shown in FIG. 4, a tertiary coil 27 is formed in a transformer 1, and an output voltage detection circuit 28 is connected to the tertiary coil 27. The output voltage detection circuit 28 comprises a rectifying diode 30, a commutating diode 31, an inductor 32, and a capacitor 33. The output voltage detection circuit 28 has the same circuit structure as that of the output-side circuit 10. The output voltage detection circuit 28 rectifies and smoothes an AC current and an AC voltage outputted from the tertiary coil 27 by the choke-input rectifying method, as in the case of the output-side circuit 10. The rectified and smoothed voltage is charged in the capacitor 33.

The charging voltage of the capacitor 33 is a voltage corresponding to the output voltage Vout of the switching power supply unit. The output voltage detection circuit 28 detects and outputs the charging voltage of the capacitor 33.

In the circuit shown in FIG. 4, one end of a current detection resistor 21 of an output current detection circuit 20 is connected to the source of a main switching element 3. The other end of the current detection resistor 21 is connected to the drain of a MOS-FET 22, and the gate of the MOS-FET 22 is connected to the gate of the main switching element 3. In addition, the source of the MOS-FET 22 is connected to one end of a charging-capacitor 23, and the other end of the charging-capacitor 23 is connected to one end of the capacitor 33 of the output voltage detection circuit 28 and the source of the main switching element 3, respectively.

As described above, the charging-capacitor 23 of the output current detection circuit 20 is connected in series to the capacitor 33 of the output voltage detection circuit 28. The part where the charging-capacitor 23 and the capacitor 33 are connected in series is connected in parallel to the part where voltage-dividing resistors 34 and 35 are connected in series.

The node of the voltage-dividing resistors 34 and 35 is connected to the (−) input terminal of an error amplifier (an operational amplifier) 36, and a reference voltage source 37 is connected to the (+) input terminal of the error amplifier 36. The output terminal of the error amplifier 36 is connected to the (+) input terminal of the comparator 38, and a triangular-wave oscillator 40 is connected to the (−) input terminal of the comparator 38. The output terminal of the comparator 38 is electrically connected to the gate of the main switching element 3 and the gate of the MOS-FET 22, respectively.

In the output current detection circuit 20 shown in FIG. 4, as in the case of the output current detection circuit 20 shown in FIG. 2, the MOS-FET 22 is switched on-off in sync with the on-off switching operation of the main switching element 3, by which a current flowing through the current detection resistor 21 is rectified, and the rectified current is charged in the charging-capacitor 23. The charging voltage of the charging-capacitor 23 is, as described above, the voltage corresponding to the output current Iout of the switching power supply unit.

In the circuit shown in FIG. 4, a switching control circuit controlling the switching of the main switching element 3 is formed by the voltage-dividing resistors 34 and 35, the error amplifier 36, the reference voltage source 37, the comparator 38, and the triangular-wave oscillator 40.

As described above, in the circuit shown in FIG. 4, since the charging-capacitor 23 is connected in series to the capacitor 33 of the output voltage detection circuit 28, the charging voltage of the charging-capacitor 23 (that is, the output voltage of the output current detection circuit 20) is superimposed upon the charging voltage of the capacitor 33 (that is, the output voltage of the output voltage detection circuit 28). The superimposed voltage is divided by the voltage-dividing resistors 34 and 35. With both the outputting operation of the error amplifier 36 based on the divided voltage, and the comparing operation of the comparator 38 based on an output signal of the error amplifier 36 and an output signal of the triangular-wave oscillator 40, a pulse signal under a PWM (Pulse-Width Modulation) control is applied to the gate of the main switching element 3 to stabilize the output voltage Vout of the switching power supply unit.

In the switching power supply unit of the second example shown in FIG. 4, the output current detection circuit 20 having the structure shown in FIG. 1, which is distinctive in this embodiment, is used. Thus, as described above, the hindrances to cost reduction and miniaturization can be avoided. Furthermore, deterioration of the circuit efficiency of the switching power supply unit caused by the components of the output current detection circuit can be prevented.

Furthermore, in the second example, the output voltage of the output current detection circuit 20 is superimposed upon the output voltage of the output voltage detection circuit 28, and the superimposed voltage is inputted in the switching control circuit to be used for controlling the on-off switching operation of the main switching element 3, which leads to further stabilization of the output voltage Vout of the switching power supply unit.

More specifically, in the circuit structure shown in FIG. 4, a phenomenon in which the output voltage Vout decreases as the output current Iout of the switching power supply unit increases occurs. However, when the output voltage Vout is indirectly detected and outputted by the output voltage detection circuit 28 having the same circuit structure as that of the output-side circuit 10, changes in a decrease in the output voltage Vout due to an increase in the above output current Iout do not appear as the changes in the output voltage of the output voltage detection circuit 28. As a result, with the structure in which the switching control of the main switching element 3 is performed only by the output voltage of the output voltage detection circuit 28, there is a problem that the switching control of the main switching element 3 is not performed to compensate for the decreased amount of the output voltage Vout, although the output voltage Vout decreases to be below a set value due to the increase in the output current Iout.

In contrast, as shown in FIG. 4, the output voltage of the output current detection circuit 20 is superimposed upon the output voltage of the output voltage detection circuit 28, and then, the superimposed voltage is applied to the switching control circuit so as to perform the switching control of the main switching element 3. With this arrangement, both a voltage having information on the output voltage Vout of the switching power supply unit and a voltage having information on the output current Iout thereof are used for performing the switching control of the main switching element 3. Therefore, the decrease in the output voltage Vout due to the increase in the output current Iout can be compensated. Accordingly, a switching power supply unit having a significantly high constant-voltage precision can be provided.

As shown in FIG. 5, the output voltage detection unit 11a directly detecting the output voltage Vout of the switching power supply unit has a short-lived component, such as a photo coupler. Thus, with the use of the short-lived photo coupler, it is difficult to increase the longevity of the switching power supply unit. However, as shown in FIG. 4, the output voltage detection circuit 28 indirectly detecting the output voltage Vout of the switching power supply unit does not have any short-lived components. As a result, it is easy to increase the operating life of the switching power supply unit.

As described above, according to the second example, there is an advantage in which the switching power supply unit having a long operating life and a significantly high constant-voltage precision can be provided.

This invention, however, should not be restricted to the above embodiments, and various modifications of embodiments can be applied in the present invention. For example, in the above embodiment, the first example uses the output voltage of the output current detection circuit 20 to protect from an excessive current by incorporating the output current detection circuit 20 shown in FIG. 1 into the switching power supply unit, as shown in FIG. 2. Furthermore, the second example uses the output voltage of the output current detection circuit 20 to control the switching of the main switching element 3 by incorporating the output current detection circuit 20 into the switching power supply unit, as shown in FIG. 4. However, it is also possible to use the output voltage of the output current detection circuit 20 to perform other controlling operations, which are not performed in the above examples, by incorporating the output current detection circuit 20 distinctive in this embodiment in the switching power supply unit, with an arrangement different from those in the first and second examples.

For instance, when two or more switching power supply units are used to be connected in parallel, the output current detection circuit 20 as shown in each of the embodiments is incorporated in each of the switching power supply units to obtain the output voltage of the output current detection circuit 20 of each of the switching power supply units. The output current Iout of each of the switching power supply units can be controlled in such a manner that the balance between the output currents Iout of the plurality of the switching power supply units is a specified current balance based on the obtained output voltages of the output current detection circuits 20. In this way, the output voltage of the output current detection circuit 20 can be used for performing controlling operations to improve a current balance between the output currents Iout obtained when the switching power supply units are driven in parallel.

In addition, in the switching power supply unit outputting a constant current, with the use of the output voltage of the output current detection circuit 20, the switching control of a main switching element 3 may be performed so as to stabilize the output current Iout. The output current detection circuit 20 used in the embodiments of the present invention can output a voltage corresponding to the output current Iout of the switching power supply unit with significantly high precision. Accordingly, as described above, a significantly stabilized output current Iout can be obtained by performing the switching control of the main switching element 3 with the use of the output voltage of the output current detection circuit 20. As a result, it is possible to provide a switching power supply unit having a high constant-current precision.

Furthermore, in each of the above first and second examples, the switching control is performed in such a manner that the MOS-FET 22 is switched on the instant when the main switching element 3 is switched on. However, the switching control of the MOS-FET 22 may be performed in such a manner that after the main switching element 3 is switched on, (for example, with the delay of a few tens of nsec after the switching-on of the main switching element 3), the MOS-FET 22 is switched on.

In this way, the following advantage can be obtained by switching on the MOS-FET 22 later than switching on the main switching element 3. At the instant when the main switching element 3 is switched on, the parasitic capacitance of the transformer 1 and the parasitic capacitances of the components comprising the output-side circuit 10 are short-circuited and a spike current as shown in a part a of FIG. 3D flows.

When the MOS-FET 22 is switched on the instant when the main switching element 3 is switched on, the above spike current flows into the charging-capacitor 23, by which a significantly large voltage is applied to the comparator 25 from the charging-capacitor 23. In spite of the fact that the output current Iout is not in an overcurrent state, there seems to occur a malfunction in which a signal informing the overcurrent state is outputted from the comparator 25.

In contrast, when the MOS-FET 22 is switched on, after suppression of the spike current generated by switching on the main switching element 3, for example, with the delay of a few tens of nsec after the main switching element 3 is switched on, the flow of the spike current into the charging-capacitor 30 can be reliably prevented. As a result, occurrence of the malfunction due to the spike current can be prevented.

Since almost no malfunctions due to the spike current as described above occur, there are almost no problems even though both the main switching element 3 and the MOS-FET 22 are simultaneously switched on, as in the first and second examples.

Furthermore, although the first example uses the comparator 25, an operational amplifier can be used as an alternative to the comparator 25.

Furthermore, in each of the first and second examples, although the main switching element 3 is formed by an N-channel MOS-FET, the main switching element 3 may be formed by a switching element other than an N-channel MOS-FET, such as a P-channel MOS-FET, a bipolar transistor, or IGBT. In addition, as alternatives to the rectifying diodes 6 and 30, and the commutating diodes 7 and 31 shown in the first and second examples, synchronous rectifying elements such as MOS-FETs may be used. In addition, although the MOS-FET 22 is formed by an N-channel MOS-FET, it may be formed by a P-channel MOS-FET.

Furthermore, in each of the first and second examples, although the switching power supply unit has a circuit structure of a forward converter system, the output current detection circuit distinctive in the present invention can be incorporated in switching power supply units of other various systems. For example, there can be applied a switching power supply unit of an isolation DC—DC converter system such as a fly-back converter system, a switching power supply unit of a isolation DC—DC converter system, a switching power supply unit of an AC-DC converter system, and a switching power supply unit of an inverter system. Accordingly, the present invention should not be restricted to the above first and second examples.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply unit, which rectifies and smoothes an AC current and an AC voltage from an on-off switching operation of a main switching element to output a DC current and a DC voltage, comprising an output current detection circuit including a current detection resistor disposed in an intermittent-current flowing path through which a current intermittently flows in sync with the on-off switching operation of the main switching element, a synchronous rectifying element comprising a switching element for rectifying a current flowing through the current detection resistor, and a capacitor for charging the current rectified by the synchronous rectifying element, wherein the current flowing through the current detection resistor is charged in the capacitor by a rectifying operation of the synchronous rectifying element, and a charging voltage of the capacitor is provided as a voltage corresponding to the output current of the switching power supply unit.

2. The switching power supply unit of claim 1, further comprising an overcurrent protection circuit to protect the switching power supply unit by controlling the on-off switching operation of the main switching element such that the output current decreases so as to eliminate an overcurrent state when the output current of the switching power supply unit is in an overcurrent state, and the voltage provided from the output current detection circuit is applied to the overcurrent protection circuit to be used as a voltage for detecting the overcurrent state.

3. The switching power supply unit of claim 1, wherein the switching power supply unit has a power transformer having a primary side and a secondary side, and further wherein, on the primary side, an output voltage detection circuit having a smoothing/rectifying circuit structure similar to that of a secondary-side circuit of the switching power supply unit is disposed to indirectly detect and output the output voltage of the switching power supply unit; and a switching control circuit is disposed to control the on-off switching operation of the main switching element by using the voltage detected and provided by the output voltage detection circuit so as to control stabilization of the output voltage of the switching power supply unit, the voltage provided from the output current detection circuit being superimposed on the voltage detected and provided by the output voltage detection circuit, and further, the superimposed voltage being provided to the switching control circuit to be used for controlling the on-off switching operation of the main switching element.

4. The switching power supply unit of claim 1, wherein the synchronous rectifying element is a MOS-FET.

5. The switching power supply unit of claim 2, wherein the synchronous rectifying element is a MOS-FET.

6. The switching power supply unit of claim 3, wherein the synchronous rectifying element is a MOS-FET.

7. The switching power supply unit of claim 1, further comprising an output voltage detection circuit for detecting an output voltage of the switching power supply unit and for providing a control signal to control the main switching element to regulate the output voltage.

8. The switching power supply unit of claim 7, wherein the output voltage detection circuit directly detects the output voltage.

9. The switching power supply unit of claim 7, wherein the output voltage detection circuit indirectly detects the output voltage.

10. The switching power supply unit of claim 9, further comprising a power transformer having a primary, second and tertiary winding, the output voltage being provided from said secondary winding after rectification and smoothing, said output voltage detection circuit being coupled to said tertiary winding to indirectly detect said output voltage.

11. The switching power supply unit of claim 1, wherein the switching element is turned on at substantially the same time as the main switching element.

12. The switching power supply unit of claim 1, wherein the switching element is turned on a short time after the main switching element to prevent a spike voltage from being provided to said capacitor.

13. An output current detection circuit for a switching power supply, the switching power supply rectifying and smoothing an AC current and an AC voltage from an on-off switching operation of a main switching element to output a DC current and a DC voltage, the output current detection circuit comprising a current detection resistor disposed in an intermittent-current flowing path through which a current intermittently flows in sync with the on-off switching operation of the main switching element, a synchronous rectifying element comprising a switching element for rectifying a current flowing through the current detection resistor, and a capacitor for charging the current rectified by the synchronous rectifying element, wherein the current flowing through the current detection resistor is charged in the capacitor by a rectifying operation of the synchronous rectifying element, and a charging voltage of the capacitor is provided as a voltage corresponding to the output current of the switching power supply.

14. The output current detection circuit of claim 13, wherein the synchronous rectifying element has a control terminal connected to the control terminal of the main switching element.

* * * * *